United States Patent

[11] 3,603,370

| [72] | Inventors | Edgar W. Hylbert<br>Akron, Ohio;<br>Bernd F. O. Tomaszewski, Kuenzell,<br>Germany; Jacob Kleywegt, Arlon, Belgium;<br>Hans Dietl, Colmar Berg, Luxembourg |
|---|---|---|
| [21] | Appl. No. | 880,555 |
| [22] | Filed | Nov. 28, 1969 |
| [45] | Patented | Sept. 7, 1971 |
| [73] | Assignee | The Goodyear Tire & Rubber Company<br>Akron, Ohio |

[54] PNEUMATIC TIRE
7 Claims, 4 Drawing Figs.

| [52] | U.S. Cl. | 152/209 |
|---|---|---|
| [51] | Int. Cl. | B60c 11/08 |
| [50] | Field of Search | 152/209, 210 |

[56] References Cited
UNITED STATES PATENTS

| 2,571,922 | 10/1951 | Morrison | 152/209 |
| 2,626,649 | 1/1953 | Eiler et al. | 152/209 |

FOREIGN PATENTS

| 156,404 | 5/1954 | Australia | 152/209 |
| 1,009,954 | 6/1957 | Germany | 152/209 |

Primary Examiner—James B. Marbert
Attorneys—F. W. Brunner and Michael L. Gill

ABSTRACT: A rear tractor tire having a tread with alternating long and short lugs on each side, each long lug having an inner portion extending at a low angle with respect to the midcircumferential centerline of the tread and an outer portion extending at a high angle with respect to said circumferential centerline, and each short lug being disposed at a high angle with respect to said midcircumferential centerline.

The foregoing abstract is not to be taken as limiting the invention of this application, and in order to understand the full nature and extent of the technical disclosure of this application, reference must be made to the accompanying drawings and the following detailed description.

PATENTED SEP 7 1971

INVENTORS
EDGAR W. HYLBERT
BERND F. O. TOMASZEWSKI
JACOB KLEYWEGT
HANS DIETL

BY *Michael L. Gill*
ATTORNEY

INVENTORS
EDGAR W. HYLBERT
BERND F. O. TOMASZEWSKI
JACOB KLEYWEGT
HANS DIETL

BY Michael L. Gill
ATTORNEY

PNEUMATIC TIRE

This invention relates to pneumatic tires and more particularly to rear traction tires used on farm tractors.

The design of a tractor tire that gives good traction on soft ground and also a smooth ride and long wear characteristics on hard surfaces has always presented a problem to the tractor tire designer. It is an object of this invention to provide a pneumatic tire tread which will afford good traction on soft ground and at the same time, provide smooth riding qualities and long tread wear on hard surfaces.

The invention accordingly consists in the features of construction, combination of elements and arrangement of parts which will be exemplified in the construction hereafter set forth and the scope of the application of which will be indicated in the appended claims.

Figure 4:
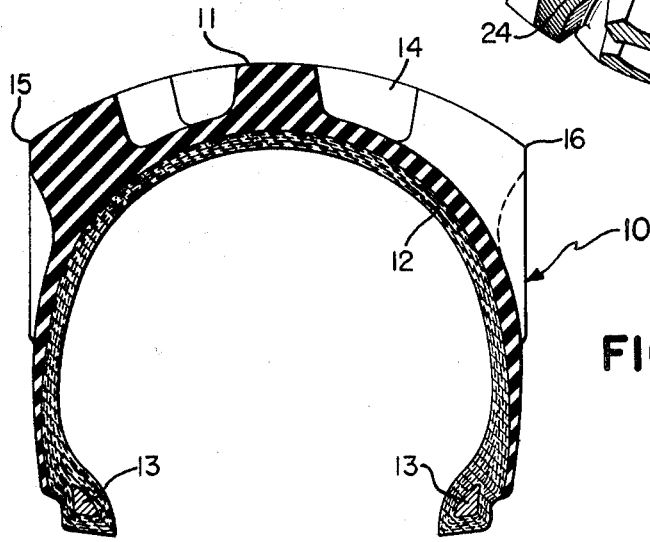
FIG. 4 is a cross-sectional view taken substantially along lines 4—4 of FIG. 2.

With reference to the drawings and particularly FIG. 4, a tractor tire 10 constructed in accordance with this invention comprises a tread portion 11 overlying a carcass 12 which in turn terminates in beads 13 at its inner extremities. The tread portion comprises a series of deep lugs 14 which terminate at their outer ends at the lateral edges 15 and 16 of the tread 11.

Figure 1:
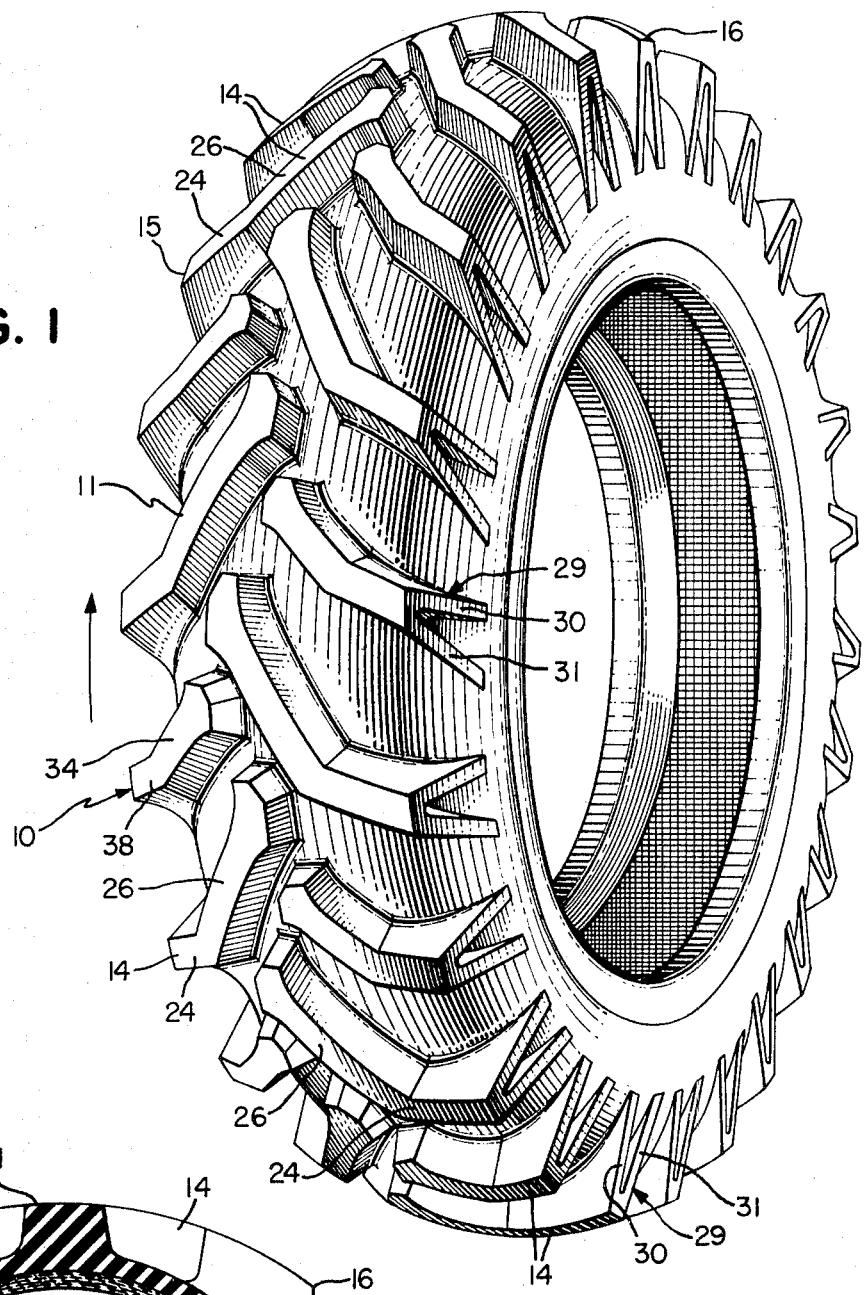
FIG. 1 is a perspective view of a tire constructed in accordance with this invention.
Figure 2:
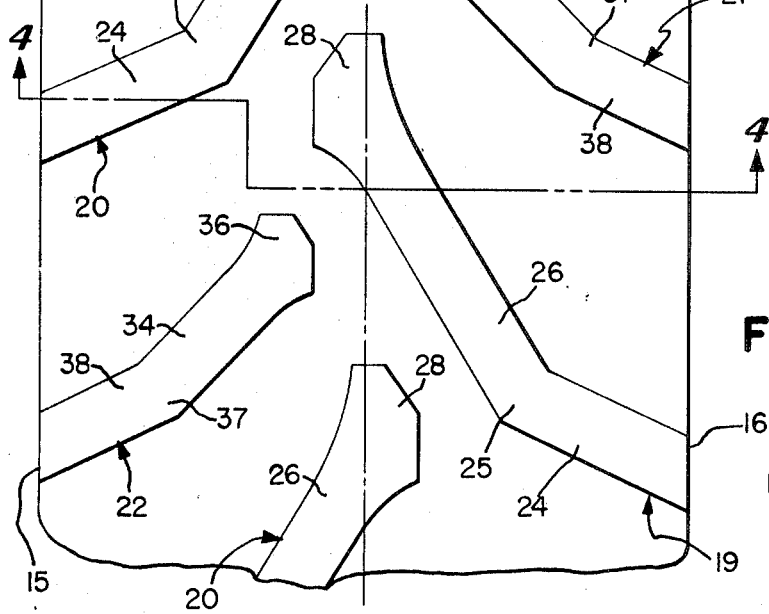
FIG. 2 is a plan view of a section of the tread of the tire of FIG. 1.

With particular reference to FIGS. 1 and 2, the traction portion or tread of the tire of this invention comprises two sets of primary lugs 19 and 20 and two sets of secondary lugs 21 and 22. The first set of primary lugs 19 on the first side of the tire is generally similar to the second series of primary lugs 20 on the second side of the tire but opposite in hand. Likewise, each lug of a first series of secondary lugs 21 on said first side of the tire is similar to each lug of the second series of secondary lugs 22 on the opposite side of the tire but opposite in hand.

Referring now to one side of the tread as illustrated in FIGS. 1 and 2, a first set of the primary lugs 19 extends angularly of and from the lateral edge 16 of the tread 11. Each lug in this first set of primary lugs 19 comprises an outer portion 24 which extends from one outer edge 16 of the tread generally laterally of the tread and approximately one-half of the distance to the midcircumferential centerline 18 of the tread at an angle of approximately 67° to said midcircumferential centerline 18. For purposes of this invention the midcircumferential centerline 18 shall mean a circle which lies on the ground contacting surface of the tread midway between the lateral edges 15 and 16 of the tread and is contained in a plane which is perpendicular to the rotational axis of the tire. Each lug 19 has an inner portion 26 which extends angularly of and from the inner end 25 of the outer portion 24 of the lug, across the midcircumferential centerline 18 and at an angle of 32° to said midcircumferential centerline. Each primary lug terminates at its inner end in an enlarged portion 28 which lies generally in the area of the midcircumferential centerline 18. As best seen in FIG. 1, the outside end 29 of each primary and secondary lug has a V-shaped configuration when viewed from the side of the tire. The intersection of the legs of the V is the radially outermost part of the V with respect to the rotational axis of the tire. The leading edge of the lug has its leg 30 of the V arranged substantially radially with respect to the rotational axis of the tire. For purposes of this invention "leading" shall mean a part or portion of the tread that contacts the ground first, with respect to a series of such parts or portions, during normal rotation of the tire and "lagging" shall mean that part or portion of the tread that contacts the ground last, with respect to a series of such parts or portions. It should be noted that the tire of this invention has a directional tread in that there is a normal or preferred direction of rotation of the tire for best overall performance as indicated by the arrow in FIG. 1. The lagging leg 31 of each lug end 29 is inclined with respect to a radius from the axis of rotation and away from the direction of rotation. This provides additional support for the outer end of the lugs to prevent bending of the lugs when the tire is in traction.

On the same side of the tire containing the lateral edge 16, there is also a first series of secondary lugs 21 disposed one only between each next adjacent pair of primary lugs 19. Each lug of this first set of secondary lugs 21 comprises an outer portion 38 which extends from the outer edge 16 generally laterally of the tread and approximately one-third of the distance to the midcircumferential centerline 18 at an angle of approximately 67° to said midcircumferential centerline 18. Each lug 21 has an inner portion 34 which extends angularly of and from the inner end 37 of the outer portion 38 and approximately two-thirds of the distance from said inner end 37 to the midcircumferential centerline at an angle of approximately 45° to said midcircumferential centerline. The inner end of each lug 21 has an enlarged ground contacting portion 36.

The second series of primary lugs 20 and the second series of secondary lugs 22 are substantially identical to the first series of primary lugs 19 and the first series of secondary lugs 21, respectively, with the exception of the fact that they are opposite in hand and extend angularly of and from the opposite side or lateral edge 15 of the tread 11. The first series 19 of primary lugs are in staggered relationship around the circumference of the tire with respect to the second series of primary lugs 20. Likewise, the first series of secondary lugs 21 are in staggered relationship around the circumference of the tire with respect to the second series of secondary lugs 22; or in other words, each primary lug 19 on one side of the tread is offset circumferentially of the tire with respect to the next adjacent two primary lugs 20 on the opposite side of the tread. Likewise, each secondary lug 21 on one side of the tread is offset circumferentially of the tire with respect to the next adjacent two secondary lugs 22 on the opposite side of the tread.

The inner portion 26 of each primary lug 19 and the inner portion 34 of each secondary lug 21 on one side of the tire are oriented with respect to the inner portion 26 of a corresponding primary lug 20 on the opposite side of the tire in a manner such that if the first mentioned lugs 19 and 21 were extended longitudinally they would intersect the inner portion 26 of said corresponding lug 20 on the opposite side of the tire. The first mentioned inner portions 26 and 34 terminate short of the corresponding primary lug 20 by a distance approximately equal to the width of a lug.

Each secondary lug 21 or 22 extends close enough to the midcircumferential centerline and each primary lug 20 or 19 crosses the midcircumferential centerline by a sufficient distance such that the inner end of each secondary lug 21 or 22 touches or passes through a plane perpendicular to the rotational axis of the tire which is tangent to the inner end of its respective leading lug 20 or 19 on the opposite side of the tread.

In the particular embodiment described, the outer portion 24 of the primary lugs 19 and 20 were described as extending at an angle of approximately 67° to a midcircumferential circle 18. It is preferred that this angle lie between 60° and 75° for best traction qualities. The inner portions 26 of the primary lugs were described as being disposed at an angle of 32° to the midcircumferential centerline 18. For best riding qualities, this angle should be between 15° and 35°. In the case of the secondary lugs, the outer portions 38 of the lugs should extend at an angle of between 60° and 75° to the midcircumferential centerline. The inner portions 34 of the secondary lugs 21 and 22 should lie at an angle of between 40° and 50° to the midcircumferential centerline 18.

It should also be noted that in the embodiment illustrated in FIG. 2, each first portion of each secondary lug 21 or 22 is, at the lateral edge 16 or 15 of the tread, spaced closer to its next adjacent leading lug 19 or 20 than it is to its next adjacent lagging lug 19 or 20 respectively. This irregular spacing is provided in order that the spacing between the inner portions 26 and 34 of the primary and secondary lugs is more uniform around the circumference of the tire. This uniformity as well as the low angle of the lugs in the central portion of the tread serve to provide the effect of a substantially continuous smooth riding surface when the tire is operated on hard surfaces.

Figure 3:
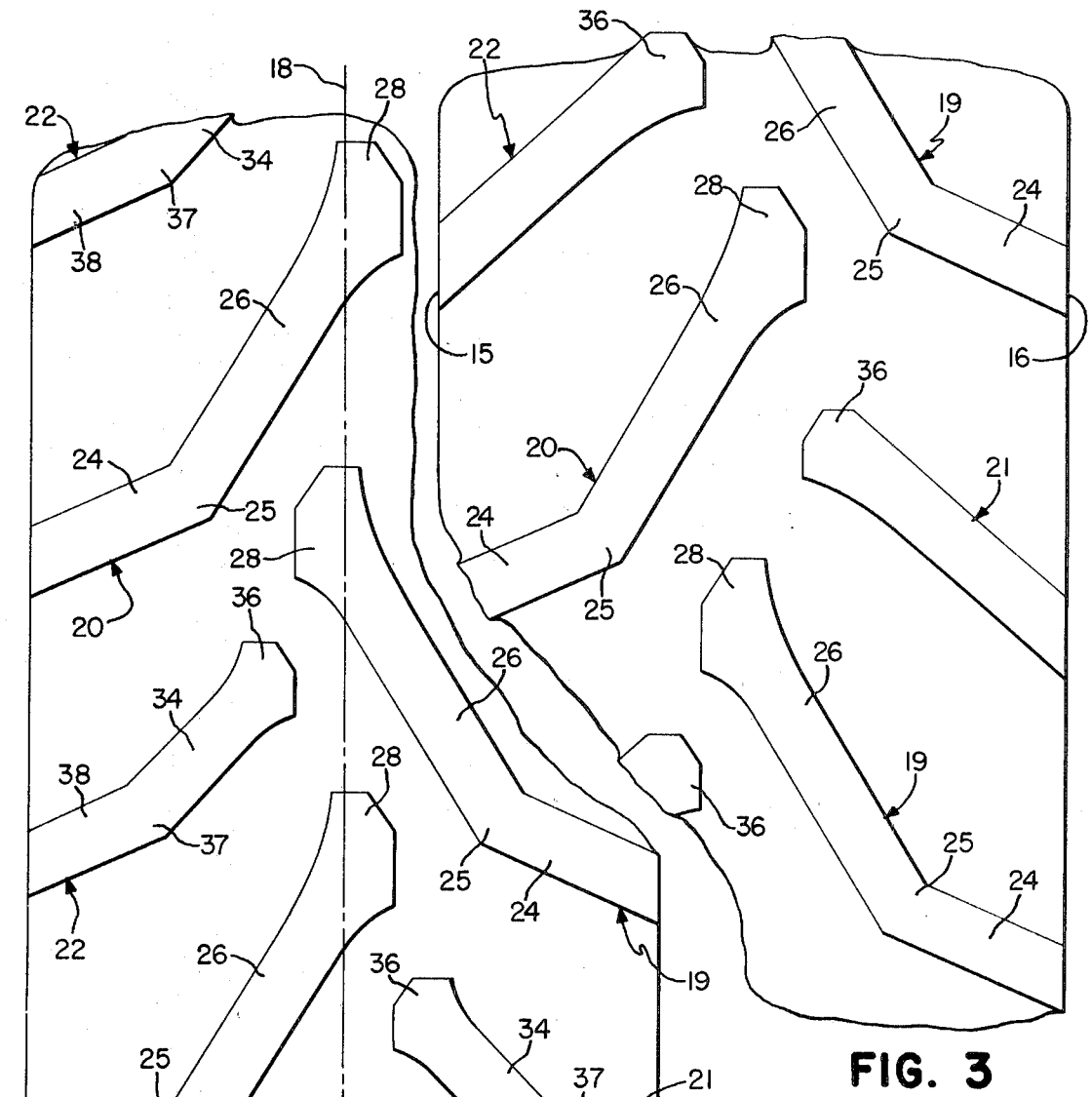
FIG. 3 is a plane view of an alternate embodiment of the tread of a tire constructed in accordance with this invention.

In an alternate embodiment of the invention illustrated in FIG. 3, the primary lugs 19 and 20 are substantially the same as those previously described. The secondary lugs 21 and 22 are also substantially the same as those previously described with the exception that each secondary lug 21 or 22 is straight and is disposed at an angle of approximately 67° to the midcircumferential centerline over its entire length. Each secondary lug 21 or 22 has a length of at least approximately four-fifths of the distance from the lateral edge 15 or 16 of the midcircumferential centerline 18. Again, for best traction this angle should be kept between 60° and 75°.

It will be noted that the outer portions 24 and 38 of each of the primary and secondary lugs of the embodiments of FIGS. 1 and 2 are at a high angle relative to the midcircumferential centerline 18. This portion of the lug, because of its high angle, provides very good tractive forces on soft or muddy ground. It can be readily appreciated that this portion of each lug is quite rigid. This rigidity is enhanced by tying the inner end 25 of the high angle first portion of each primary lug to the low angle second portion 26 of each primary lug in order to reduce bending of the lug during traction. Also, the V-shaped configuration of the end portion 29 of each lug serves to stabilize the outer end. The supported low angle portions 24 provide good traction in soft ground yet are still rigid enough that they have substantially less tendency to bend, flex and scrape when used on hard surfaces, thus improving tread life. The rigidity of the secondary lugs 21 and 22 is enhanced by this same angle in lugs intermediate the ends thereof in the tire of FIGS. 2 and 4. The rigidity of the secondary lugs 21 and 22 in the tire of FIG. 3 is enhanced by the enlarged inner portion 36.

Each inner portion or low angle portion 26 of a primary lug 19 on one side of the tread circumferentially overlaps a portion of the low angle portion 26 of the next adjacent leading and lagging primary lug 20 on the opposite side of the tread, or in other words, any line drawn transversely across the tread and perpendicular to the midcircumferential centerline will cross at least one inner portion 26 of a primary lug 19 or 21. As noted before, this low angle portion provides the effect of a generally continuous supporting surface circumferentially of the tire which results in smooth riding qualities. It should also be noted that each inner portion 26 of a primary lug 19 or 20 has a corresponding inner portion 34 of a secondary lug 21 or 22 disposed laterally opposite the central portion of said inner portion 26 and on the opposite side of the tire. The aforedescribed arrangement of the primary and secondary lugs reduces and almost eliminates the wobble of a tire produced by ordinary staggered lugs on opposite sides.

The inner portions 26, 34 being disposed at a low angle with respect to the circumferential centerline serve to prevent side slip when the tire strikes a rock or other hard object. In addition to adding rigidity to the inner ends of the lugs, the enlarged inner ends thereof provide increased riding surface which adds to the tire's smooth riding qualities.

While certain representative embodiments and details have been shown for the purpose of illustrating the invention, it will be apparent to those skilled in the art that various changes and modifications may be made therein without departing from the invention.

What is claimed:

1. In a pneumatic tire for tractors and like vehicles wherein the tire has a tread portion, the improvement which includes in the tread portion: two sets of primary lugs and two sets of secondary lugs; each lug of a first set of said primary lugs including a first and second portion, said first portion extending from one lateral edge of the tread approximately one-half of the distance to the center of the tread at an angle of between 60° and 75° to the midcircumferential centerline of the tread, said second portion extending from the inner end of said first portion across the center of the tread at an angle of between of between 15° and 35° to said midcircumferential centerline; each lug of the second set of primary lugs being similar to said first set of said primary lugs but opposite in hand, extending from the other lateral edge of the tread and being offset circumferentially of said tire with respect to the next adjacent pair of primary lugs in said first set of primary lugs; each lug of a first set of said secondary lugs extending from said one lateral edge of the tread at an angle of between 60° and 75° to said midcircumferential centerline, terminating short of said midcircumferential centerline and being disposed one only between each next adjacent pair of primary lugs in the first set of said primary lugs; each lug of the second set of said secondary lugs being similar to the first set of said secondary lugs but opposite in hand and extending from said other lateral edge of the tread.

2. A pneumatic tire as claimed in claim 1 wherein the interior end portion of each lug of said first and second set or primary lugs is enlarged in ground contacting area.

3. A pneumatic tire as claimed in claim 1 wherein each lug of said first and second sets of secondary lugs includes a first and second portion; each said first portion extending from a lateral edge of the tread approximately one-third of the way to the center of the tread at an angle of between 60° and 75° to said midcircumferential centerline; each said second portion of each lug extending from the inner end of said first portion of the lug approximately two-thirds of the distance from said inner end to the center of said tread at an angle of between 40° and 50° with respect to said midcircumferential centerline.

4. A pneumatic tire as claimed in claim 3 wherein the inner end of each lug of each set of lugs is enlarged in ground contacting area.

5. A pneumatic tire as claimed in claim 4 wherein each lug of said first and second set of secondary lugs is at the lateral edge of said tread disposed closer to its respective leading primary lug than it is to its respective lagging primary lug at the lateral edge of said tread.

6. A pneumatic tire as claimed in claim 4 wherein said second portion of each lug of said first set of primary lugs overlaps, circumferentially of said tire, said second portion of a leading and lagging primary lug in said second set of primary lugs.

7. A pneumatic tire as claimed in claim 6 wherein the portion of each lug of said first and second set of secondary lugs that is disposed at an angle of between 40° and 50° to the midcircumferential circle is laterally opposite the second portion of a primary lug on the opposite side of said tread.